INVENTOR.
WERNER K. BENDER
BY
Hane and Nydick
ATTORNEYS

INVENTOR.
WERNER K. BENDER
BY
Hane and Nydick
ATTORNEYS

INVENTOR.
WERNER K. BENDER
BY
Hane and Nydick
ATTORNEYS

INVENTOR.
WERNER K. BENDER
BY
Hane and Nydick
ATTORNEYS

INVENTOR.
WERNER K. BENDER
BY
Hane and Nydick
ATTORNEYS

INVENTOR.
WERNER K. BENDER
BY
Hane and Nydick
ATTORNEYS

INVENTOR.
WERNER K. BENDER
BY
Hane and Nydick
ATTORNEYS

United States Patent Office 3,185,776
Patented May 25, 1965

3,185,776

INSTALLATION FOR REPRODUCING SOUND FROM A STATIONARY SOUND RECORD AREA

Werner K. Bender, Hultenius St., Plainville, Conn.

Filed Nov. 23, 1960, Ser. No. 71,349
25 Claims. (Cl. 179—100.2)

The present invention relates to an installation for reproducing sound from a sound record area associated with a visually observable object, and more particularly to an installation for reproducing sound from a sound record area associated with the object and held stationary during the reproduction of sound and the observation of the object.

It is the broad object of the present invention to provide a novel and improved installation of the general kind above referred to, for reproducing sound from a sound record area physically secured to the object or a carrier for the object.

The term "object," as sometimes used herein, is intended to encompass any object suitable for visual observation. The object may have been produced by any suitable method, such as photography, printing, painting, drawing, etc. If the object is a photographic picture, such picture may be transparent or opaque. The object may be reading material; an object of art or a manufactured product and it may also be a product of nature, such as animal or plant specimens. The object may be observed directly, either illuminated or not illuminated, and it may be magnified if necessary or desirable. The object may be projected either on a screen constituting part of the installation, or upon a remote screen. Depending upon whether the object, such as a picture, is opaque or transparent, projection may be effected by reflection of the object or in the manner of a transparency. If the object is transparent and of sufficient size, it may be mounted in the installation and illuminated from below for direct observation.

A more specific object of the invention is to provide a frame in which the object to be visually observed is mounted and which also serves as support for the sound record area, thus physically associating the object to be visually observed and the audible message pertaining thereto. The frame is so designed that it can be inserted in the installation for visual observation and audible reproduction.

Another more specific object of the invention is to provide a novel and improved installation of the general kind above referred to, which is capable of reproducing from a sound track area recorded independently of the preparation of the object and subsequently adhered to the object or its carrier. This affords full freedom as to the preparation of the object and the audible message pertaining thereto and also assures that once the object and the sound track area are united, no mismatch of the object and the message can occur.

A still more specific object of the invention is to provide a novel and improved apparatus of the general kind above referred to, for continuously reproducing from a sound track area adhered to the object or the carrier therefor while the object is being viewed.

Another more specific object of the invention is to provide a novel and improved installation for continuously reproducing from a sound track area formed by discontinuous sound tracks adhered to opposite sides of the object or the carrier therefor. This affords the advantage that a long message can be accommodated in a small area which is of great practical importance since the available area on the object of the carrier therefor is often rather limited.

Still another object of the invention is to provide a novel and improved installation which can be set for reproducing from sound track arrays of different lengths thus further increasing the versatility of the installation in that objects or object carriers of various sizes may be inserted in the same installation for observation of the object and reproduction of the message associated therewith.

A still further object of the invention is to provide a novel and improved installation for scanning two sound track areas, each composed of a plurality of parallel linear sound tracks secured to opposite sides of an object or a carrier therefor and for continuously reproducing sound from the two arrays by alternately scanning successive tracks in both arrays.

Installations according to the invention have useful applications in many fields, they can be used for scientific, entertainment and educational purposes. They are suitable, for instance, as language trainers. A student may read material and listen simultaneously to the pronunciation of the read material, or he may read material in one language while simultaneously listening to a rendition of the material into another language. A physician may study an X-ray picture while simultaneously listening to the case history. Generally speaking, the message furnishes an audible elucidation of the visual observation of the object. The audible message, of course, need not consist of words but may be in the form of music, or it may be a recording of sounds of nature, audibly implementing the visual message of a picture.

Other and further objects, features and advantages of the invention will be pointed out hereinafter and set forth in the appended claims forming part of the invention.

In the accompanying drawing, several preferred embodiments of the invention are shown by way of illustration and not by way of limitation.

Figure 1:
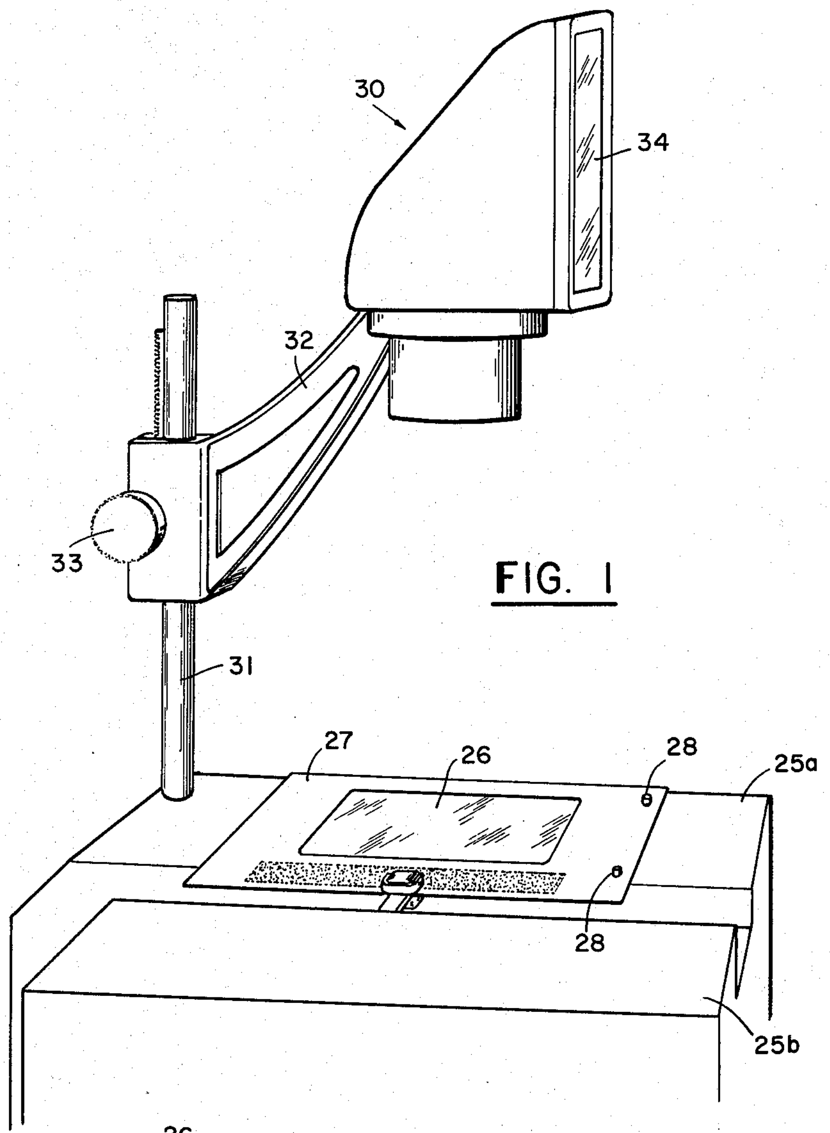
FIG. 1 is a diagrammatic perspective view of an installation according to the invention.
Figure 2:
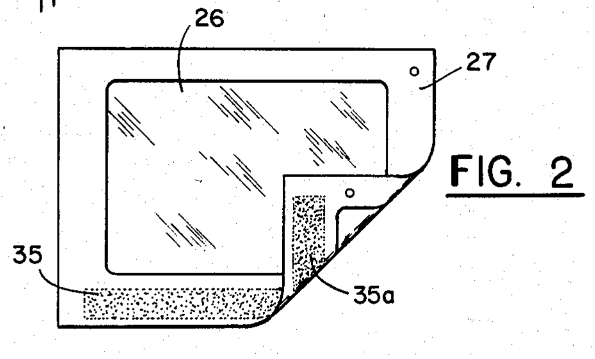
FIG. 2 is a perspective view of an object to be viewed, mounted in a frame.

Referring first to FIG. 1 in detail, the installation of the invention as exemplified in this figure, comprises a casing generally designated 25. The top of the casing constitutes a platform 25*a* on which rests the object to be visually observed and associated with an audible message pertaining to the subject matter of the object. The object is shown by way of example as a picture 26 mounted in a frame 27. The framed picture is simply placed upon the platform in an appropriate location in which it may be retained by any suitable means, such as clamping or locating pins 28. The frame is located so that the forward marginal portion of the frame extends beyond the platform for a reason which will be presently explained. The installation further comprises an optical projection unit 30 which is shown to be supported by a post 31 on which it is mounted adjustable as to height by means of a bracket 32 and a set screw 33. Of course, the projection unit may also be mounted in any other suitable manner and independent of the casing.

Picture 26 should be visualized as being an opaque photographic picture and accordingly, the projection unit should be visualized as being an epidiascope or balopticon. The unit is equipped with a built-in screen 34, but it may also be designed to project upon a remote screen. The picture may, of course, also be a transparency in which case a suitable source of light is mounted within casing 25. Generally speaking, any kind of suitable equipment, conventional or non-conventional, may be provided and used to effect visual observation of an object placed upon platform 25*a*. The means used to effect or aid in the visual observation of the object which, of course, may also be directly observed, do not constitute part of the invention and are hence not described in detail.

The invention resides in the arrangement of the sound reproducing apparatus of the installation and the manner in which the object may be visually observed and an audible message associated therewith may be reproduced.

The recording of the message to be audibly reproduced is physically secured to the object or the carrier therefor. The frame is shown as carrying on opposite sides and, more specifically, along its edge overhanging the platform 25*a* when the frame is mounted, elongated linear sound track arrays 35 and 35*a*. In some instances, a sound record array on one side of the frame is adequate, but arrays on opposite sides are generally preferable to accommodate a longer message and the apparatus as shown is designed for reproducing from two sound record arrays.

The sound recording may be basically either optical or magnetic. If optical, it may be of the varying density or the varying amplitude type. Generally, a magnetic recording has been found to be most convenient and suitable and such is shown. The recording may be effected separate from the frame on strips of recording material which are subsequently adhered to the frame. A coating of a recording compound such as magnesium oxide may also be applied directly to the opposite sides of the frame.

The recording of the message, either optical or magnetic, as the case may be, may be effected in any suitable manner. The method of recording the message does not constitute part of the invention and is hence not described in detail. It is only essential that the recorded message is fixedly adhered to the frame and that the frame, in turn, is fixedly secured to the object, thus assuring that no mis-match can occur as to the object to be observed and the sound message pertaining thereto.

As previously mentioned, the message can also be recorded on the object itself, or to put it differently, the frame may become, in effect, part of the object.

The sound recording apparatus is shown mounted along one of the sides of casing 25 for coaction with the sound record arrays on frame 27. The sound amplifying and loud speaking equipment of the apparatus may be mounted within casing 25. The amplifying and loud speaking equipment should be visualized as of conventional design and does not constitute part of the invention.

SOUND REPRODUCING APPARATUS

The sound reproducing apparatus as exemplified comprises the following basic components:

- A Sound Pickup Assembly
- A Guide and Drive Means for the Carrier for Driving the Carrier Along a Predetermined Linear Path in Either Direction
- A Control Means to Effect Reciprocatory Travel of the Carrier Along Guide Means
- A Control Means for Controlling Lateral Displacement of the Sound Pickup Assembly into Sound Reproducing Positions with Successive Sound Tracks of the Two Arrays

SOUND PICKUP ASSEMBLY

As previously pointed out, the audible message may be recorded by any of the means known and suitable for the purpose and the components of the pickup assembly must, of course, be selected in accordance with the specific type of recording that is used. Since a magnetic recording is illustrated, the sound pickup equipment is shown as comprising magnetic sound heads 40 and 40*a* which coact with the track arrays 35 and 35*a* respectively in a conventional manner. Each sound head is supported by a frame 41 and 41*a* respectively and pivoted at 42 and 42*a* respectively to a bracket or bar 43 and 43*a* respectively. The two brackets sandwich between them an arm or plate 44 which in turn is secured to a carrier generally designated 45 by any suitable means such as screws 44*a*. Brackets 43 and 43*a* are slidable in reference to arm or plate 44 within certain predetermined limits and are provided for that purpose with slots 46, 46*a* and 47, 47*a* through which extend screws or pins 48 and 49, also extending through arm or plate 44. As can be clearly seen in FIGS. 3 and 4, both sound heads can be displaced horizontally as shown in the drawing, or transversely of the direction of travel of the carrier as will be more fully explained hereinafter. The displacement of the sound heads is limited in either direction by the length of the shorter slots 46 and 46*a*.

The lateral displacement of the sound heads permits scanning of the sound tracks of the two arrays 35 and 35*a* previously described.

Figures 12, 13:
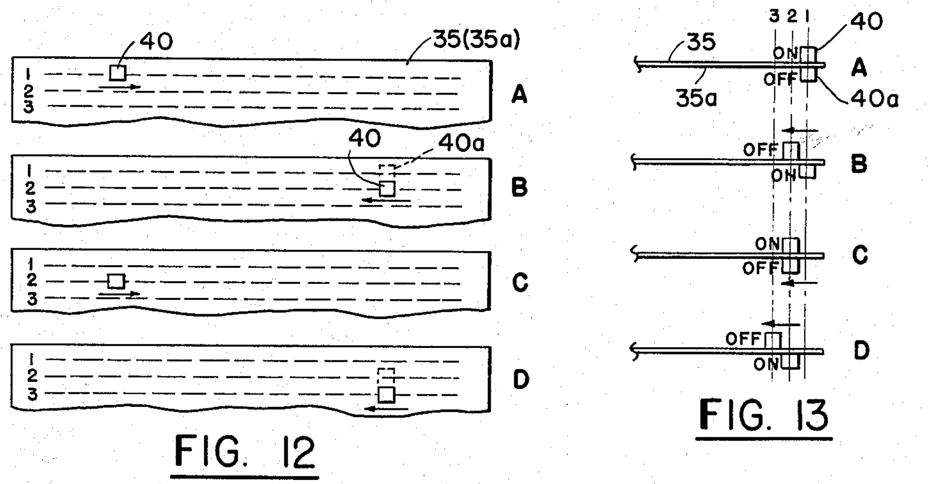
FIGS. 12 and 13 are diagrams showing in plan view and side view, respectively, the coaction between sound heads of the apparatus and the sound tracks associated with the object to be observed.

FIGS. 12 and 13 illustrate the motions to be performed by the two sound heads.

The recording on the two tracks may be visualized as being effected so that the outermost or first track of upper array 35 constitutes the first sequence of the message to be audibly reproduced; the outermost or first track of the lower array 35*a* constitutes the second sequence; the second or next adjacent track of array 35 constitutes the third sequence; the second track of array 35a the fourth sequence and so forth. Accordingly, to effect a continuing and coherent reproduction of the message, sound head 40 must first scan track 1 of array 35, then sound head 40a must scan track 1 of array 35a, then sound head 40 must scan track 2 of array 35 and so forth. This sequence is clearly evident from an analysis of FIGS. 12 and 13.

Figure 14:
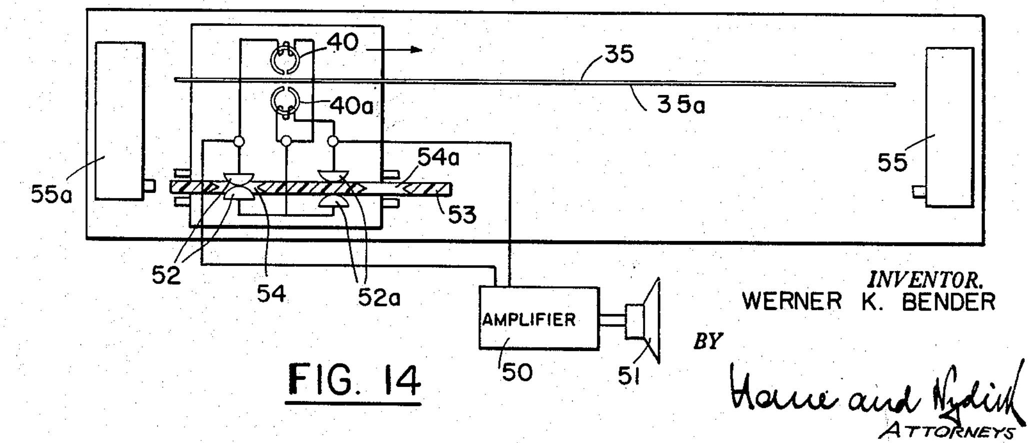
FIG. 14 is a diagram of the control circuit for the sound heads of the apparatus.

The aforedescribed alternate scanning of the two arrays presupposes that the two sound heads are alternately energized. A circuit diagram effecting such alternate energization of the sound heads is shown in FIG. 14. According to this figure, both sound heads are connected in circuit with an amplifier 50, the output of which is fed to a loudspeaker 51. The connection of the two sound heads to the amplifier is controlled by switches 52 and 52a. The opening and closing of the switches, in turn, is controlled by the position of a bar 53. As is shown, the bar is made of insulation material and has two apertures 54 and 54a which, in one position of the bar, permit closing of switch 52 and thus energization of sound head 50 and, in another position, permit closing of switch 52a through opening 54a and thus energization of sound head 40a. The longitudinal position of bar 53 is controlled by the position and travel of carrier 45. Bar 53 may be visualized as traveling in unison with the carrier and to abut in one end position of the carrier (as will be more fully explained hereinafter) with a stationary block 55 and, in the other end position of the carrier, with a stationary block 55a. Upon engagement of bar 53 with block 55, bar 53 will be longitudinally displaced from the position shown into a position in which switch 52a is closed and switch 52 is opened. Similarly, upon engagement of bar 53 with block 55a, the bar will be returned from the position just described into the illustrated position.

GUIDE AND DRIVE MEANS FOR THE CARRIER FOR DRIVING THE CARRIER ALONG A PREDETERMINED LINEAR PATH IN EITHER DIRECTION

Figure 3:
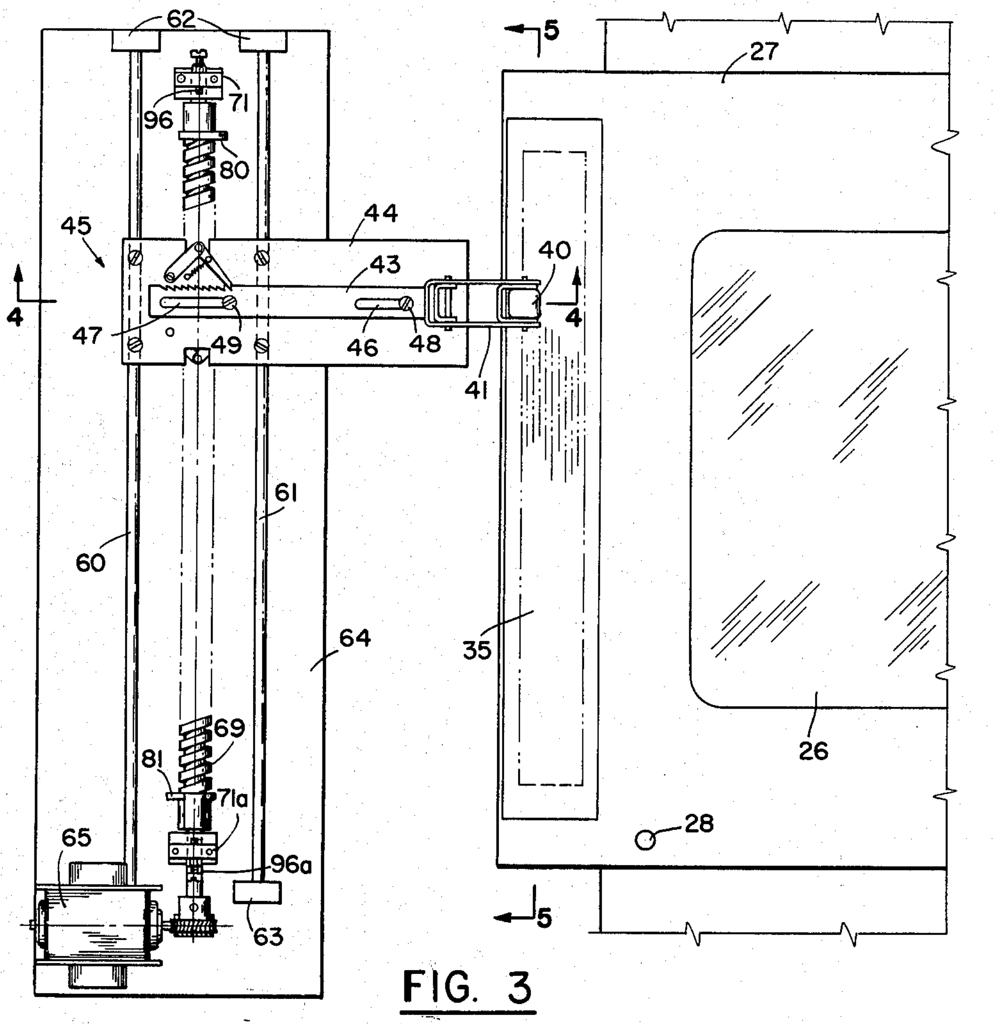
FIG. 3 is a plan view of the sound reproducing apparatus of the installation and a framed picture inserted in the apparatus.

Carrier 45, as has been previously described, supports the sound pickup assembly, is guided on two rods 60 and 61 along a linear path of a length such that the sound heads can scan the sound tracks along the entire length thereof, as can best be seen in FIG. 3. This figure also shows that the displacement of brackets or bars 43 and 43a in reference to the carrier, is transverse of the direction of travel of the carrier. Rods 60 and 61 are suitably mounted parallel to each other on a base 64 by means of mounting blocks 62 and 63.

Figure 4:
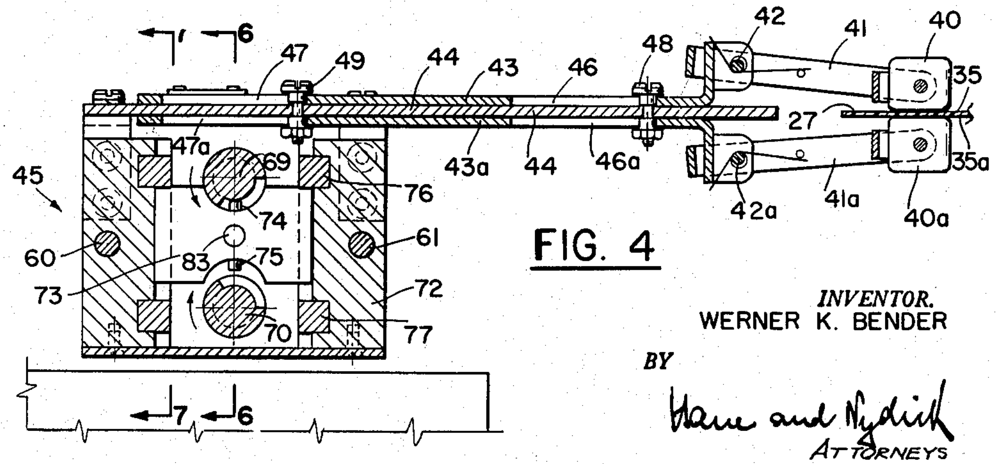
FIG. 4 is a section taken on line 4—4 of FIG. 3 on an enlarged scale.
Figure 5:
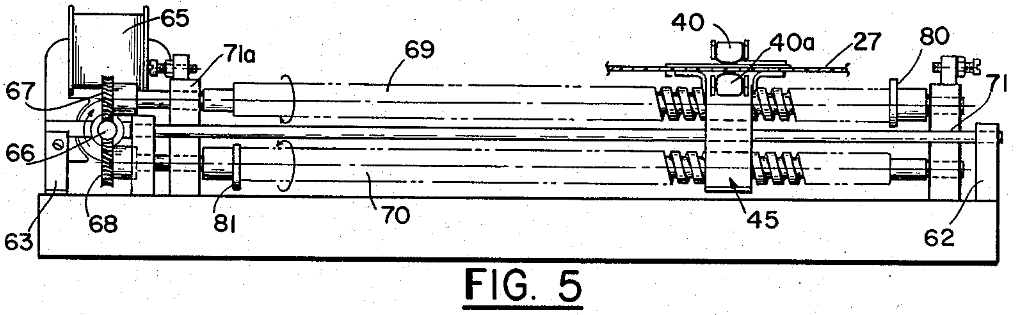
FIG. 5 is an elevational view taken on line 5—5 of FIG. 3.
Figure 6:
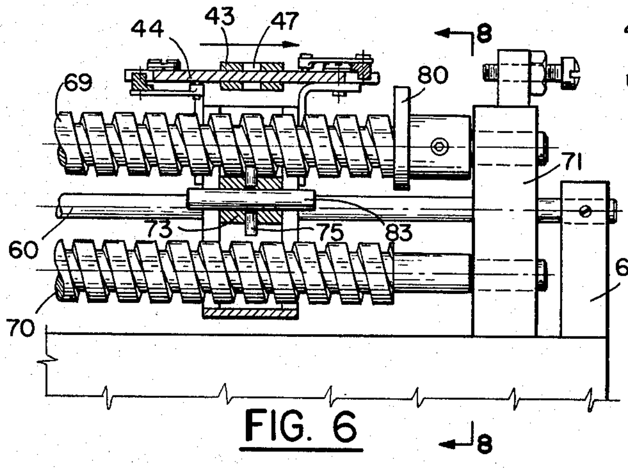
FIG. 6 is a sectional view taken on line 6—6 of FIG. 4.
Figure 7:
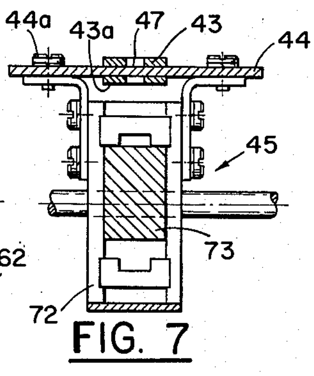
FIG. 7 is a sectional view taken on line 7—7 of FIG. 4.

The drive for the carrier is derived from a motor 65, the shaft 66 of which is coupled by two bevel gears 67 and 68 to two spirally or helically grooved rods 69 and 70 disposed one above the other. The two rods are journalled at both ends in bearings 71 and 71a. As is evident the two rods are rotated by the motor in opposite direction and are thus continuously rotated during a scanning operation. The carrier can be drivingly coupled with one or the other of rods 67 and will hence be driven either in one or the other direction, depending upon the rod to which it is coupled. To effect coupling of the carrier with either one of the rods, the carrier comprises a frame 72 having two branches through which guide rods 60 and 61 extend, as can best be seen in FIG. 4. A coupling member 73 is movable up and down in the frame as seen in FIG. 4 and mounts two coupling pins 74 and 75. In the position of FIG. 4, the coupling member 73 is shown in its upper position in which pin 74 engages the groove of rod 69, thus coupling the carrier to that rod whereas in the lower position of member 73, pin 74 is disengaged from rod 69 and pin 75 is engaged with the groove of rod 70, thus coupling the carrier to rod 70. Coupling of member 73 with alternate rods will impart a reciprocatory motion to the carrier along guide rods 60 and 61.

Coupling member 73 is releasably retained in its upper or lower position by any suitable means. These means are shown as permanent magnets 76 and 77 and the coupling member itself is made of suitable magnetizable material so that it will be attracted either in its upper position or in its lower position when the air gap between member 73 and the respective magnets 76 and 77 is closed. The lower retention means may be omitted since member 73 will tend to remain in its lower position due to its own weight, but it has been found advisable to provide the lower retention means also since the installation may be exposed to jars, or may not always be in the illustrated horizontal position.

CONTROL MEANS TO EFFECT RECIPROCATORY TRAVEL OF THE CARRIER ALONG ITS GUIDE MEANS

Figure 8:
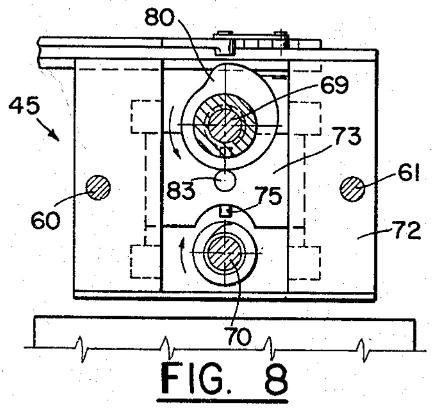
FIG. 8 is a sectional view taken on line 8—8 of FIG. 6.
Figure 9:
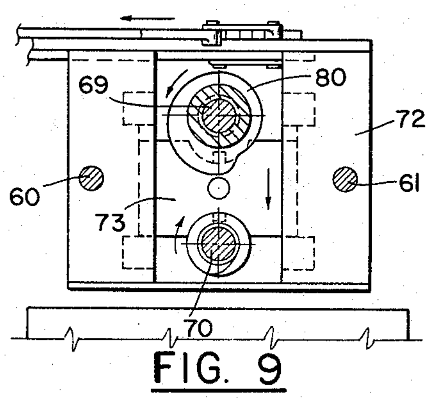
FIG. 9 is a sectional view similar to FIG. 8 and showing the apparatus in a different operational position.

The position of the coupling member 73 within the carrier is controlled by suitable control means shown as a cam control. The cam control comprises two cam discs 80 and 81, secured to opposite ends of rods 69 and 70 for rotation in unison therewith. The cam discs, the shape of which can best be seen in FIGS. 8 and 9, coact both with a cam follower 83 protruding from both ends of coupling member 73. As the carrier reaches one end of its path of travel, say the right hand end, follower 83 will engage cam disc 80 and, as a result, the coupling member will be forced from the upper position of FIG. 8 into the lower position of FIG. 9. The carrier is now coupled to the lower rod 70 and will remain so coupled until it reaches the left hand end of its travel whereupon cam disc 81 will force coupling member 73 again into its upper position and thus couple the carrier to rod 69.

CONTROL MEANS FOR CONTROLLING THE LATERAL DISPLACEMENT OF THE SOUND PICKUP ASSEMBLY INTO SOUND REPRODUCING POSITIONS WITH SUCCESSIVE SOUND TRACKS OF THE TWO ARRAYS

Figure 10:
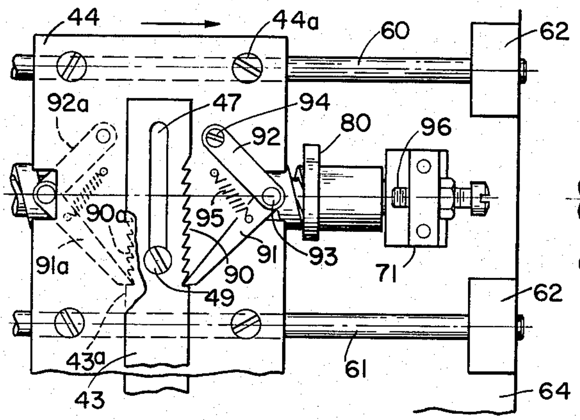
FIG. 10 is a fragmentary plan view of FIG. 3 of an enlarged scale, showing part of the control mechanism of the apparatus.
Figure 11:
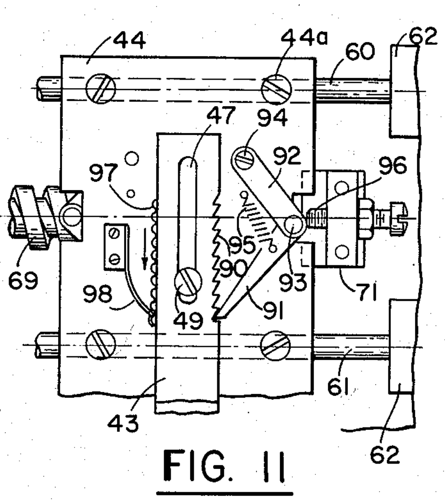
FIG. 11 is a view similar to FIG. 10 and showing the same part of the control mechanism in a different operational position.

As has been explained in connection with FIGS. 12 and 13, the two sound heads 40 and 40a must be alternately displaced by the width of one sound track upon completion of the scanning of each sound track. To effect such displacement a suitable displacement means shown as a ratchet and pawl arrangement is provided for each sound pickup assembly. As can best be seen in FIGS. 10 and 11, the ratchet of each arrangement consists of a row of teeth 90 and 90a along one longitudinal edge of bars 43 and 43a, respectively. Teeth 90 and 90a are so dimensioned that a lateral displacement of the bars by the width of one tooth moves the respective sound head into pickup position with the respective next adjacent sound track. The pawl of the arrangement comprises two elements 91, 92 and 91a, 92a respectively. The two elements are linked together by a pin 93. Element 92 is pivoted to plate 44 by a pin 94 and element 91, which constitutes the pawl proper, is biased by a spring 95 into engagement with one of the teeth 90. The two elements 91 and 92 are biased by a spring 95 into the position shown in FIG. 10. The ratchet and pawl arrangement associated with bar 43 and thus with sound head 40 coacts with a stop 96 at one end of the longitudinal travel path of the second pickup assembly and the other ratchet and pawl arrangement associated with sound head 40a coacts with a similar stop 96a at the other end of the travel path. Stops 96 and 96a, respectively, are shown in the form of adjustable screws extending through supports 71 and 71a, respectively, for the grooved rods 69 and 70.

Engagement of pawl elements 91 and 92 with stop 96 will flatten the angle defined by the two elements to an extent such that bar 43 is displaced through a distance just sufficient to move sound head 40 into pickup position with the next sound track. As is apparent, screw 96 permits a convenient adjustment of the distance through which bar 43 is displaced in response to each engagement of the pawl elements with the stop.

The ratchet and pawl arrangement associated with sound head 40a functions in the same manner as just described.

To impede an accidental displacement of the sound heads, for instance, due to a jumping of a tooth by the pawl as a result of a jar, a row of detents 97 is preferably provided along the other longitudinal edge of each bar 43 and 43a respectively. These detents are engaged by a suitable retaining spring 98.

The aforedescribed FIG. 1 shows an installation designed for visual observation of the object, either on a built-in screen or a remote screen. The sound reproducing apparatus of the installation is equally suitable for the reproduction of sound from a sound track area physically associated with an object to be examined by direct visual observation.

Figures 15, 16, 17, 18, 19, 20, 21:
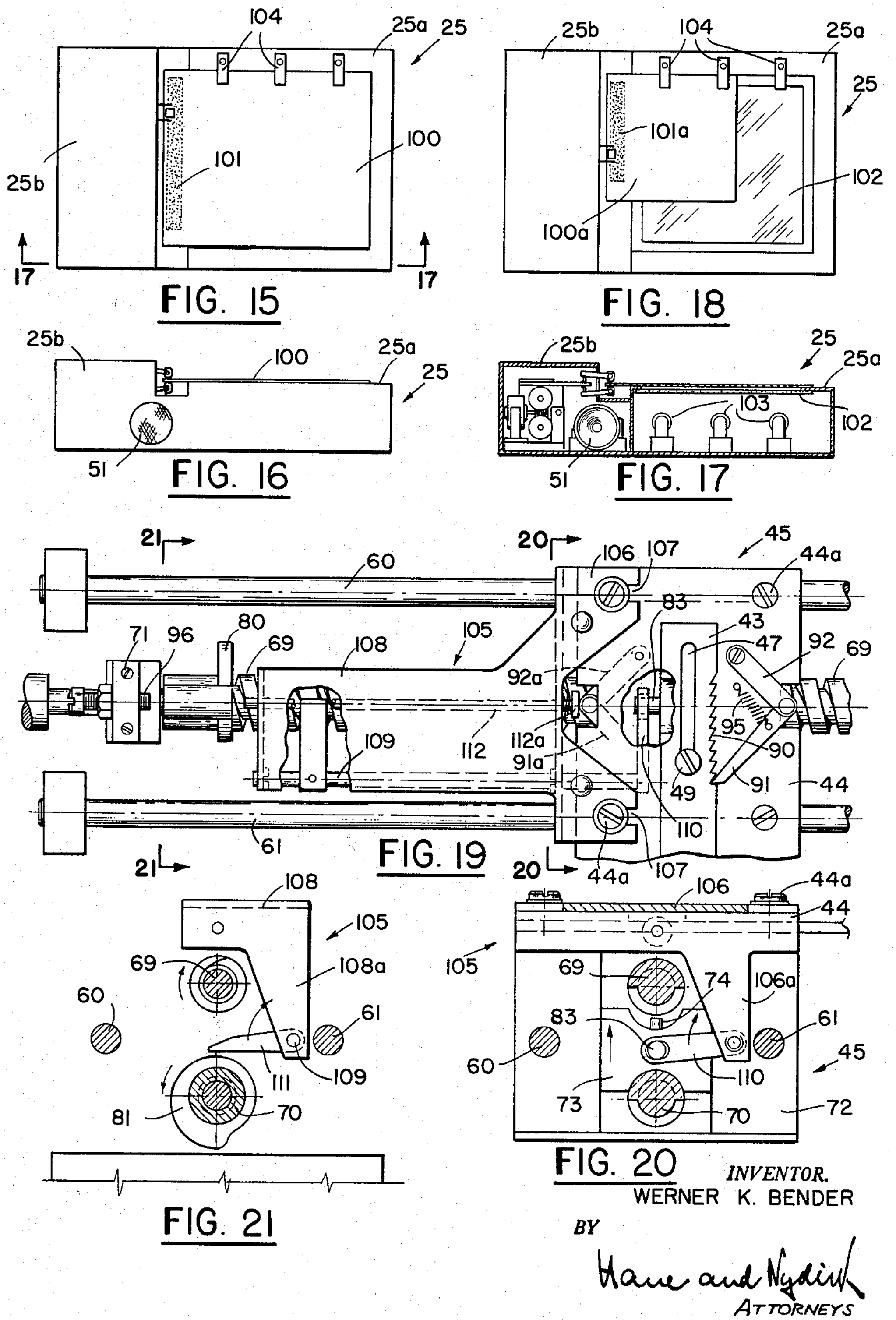
FIG. 15 is a plan view of a modification of the object supporting platform of the installation.
FIG. 16 is an elevational side view of FIG. 15.
FIG. 17 is a section taken on line 17—17 of FIG. 15.
FIG. 18 is a further plan view of the platform shown in FIG. 15 and illustrating how the platform may be used to mount objects of different sizes.
FIG. 19 is a fragmentary plan view showing a modification of the sound reproducing apparatus, and more specifically of part of the control mechanism thereof.
FIG. 20 is a section taken on line 20—20 of FIG. 19.
FIG. 21 is a section taken on line 21—21 of FIG. 19.

FIGS. 15, 16 and 17 show utilization of the installation for a direct observation of the object. As is shown in these figures, the object again is placed upon platform 25a of casing 25. The aforedescribed sound reproducing apparatus should be visualized as being housed in the left hand portion, 25b of the casing. The object 100 bears marginal sound track arrays 101 of the kind previously described on opposite sides and these sound track arrays are alternately scanned as fully described hereinbefore.

The object 100 may be visualized as a transparent X-ray photograph. The recorded message may then constitute an analysis recorded by a diagnostician for use by another physician. As is apparent, the physical association of the X-ray photograph with the case history pertaining thereto prevents effectively any confusion as to the report pertaining to a certain X-ray photograph and such confusions do not occur infrequently in busy hospitals.

The concept of the invention is applicable to numerous combinations of a picture and an audible message as is readily apparent.

To provide the illumination necessary to view a transparency placed on platform 25a, a window covered with frosted glass, 102, or similar material is provided in the platform and suitable sources of light, shown as luminescent tubes 103 are installed in casing 25. The transparency 100 or any other object is held on the platform by clamps 104 or other suitable locating means.

The installation, according to the invention, further includes means for reproducing sound from sound track arrays of different lengths and visual observation of objects of different size.

FIG. 18 shows an object 100a which is smaller than the object shown in FIG. 15 and has also shorter sound track arrays 101a. Of course, shorter sound track arrays may also be recorded on a transparency which has the full size shown in FIG. 15.

While the visual observation of a transparency of reduced size by means of the arrangement shown in FIGS. 15 through 18, provisions must be made to adapt the control of the sound reproducing apparatus to the specific length of the sound track arrays. Means suitable for the purpose are shown in FIGS. 19, 20 and 21.

The longitudinal transport of the carrier and the lateral displacement of the sound pickup assemblies on the carrier are the same as previously described. As also previously explained, reversal of the carrier is effected when cam follower 83 engages the respective cam disc 80 or 81, and lateral transport of the sound pickup assembly is effected when the pawl elements of either pickup assembly engage the corresponding stop 96 or 96a. In order to shorten the length of the carrier travel in accordance with the length of the sound track arrays, such as shortened arrays 101a, a carrier travel limiting means is provided, shown as an adapter 105. The adapter comprises a plate 106 formed with two slots 107. These slots are fitted beneath the heads of screws 44a to secure the adapter to carrier plate 44, as can be clearly seen in FIGS. 19 and 20. The adapter plate 106 is continued in a bracket 108 which extends lengthwise of guide rods 60 and 61 for the carrier. The adapter has two depending flanges 106a and 108a. These flanges form bearings for a rod 109 linked on one end by an arm 110 to cam follower 83 and mounting at the other end a lug 111. Flanges 106a and 108a further serve as bearings for a push rod 112 which may terminate on one end in a small disc 112a.

Lug 111 coacts with cam disc 81 as is shown in FIG. 21 and rod 112 coacts with pawl elements 91a and 92a.

As is apparent, lug 111 constitutes functionally an extension of cam follower 83 and rod 112 constitutes functionally an extension of stop 96. In other words, the carrier travel will be reversed when lug 111 is engaged by cam disc 80 and the respective sound pickup assembly will be displaced laterally when the left hand end of rod 112 abuts against stop 96. Accordingly, the length of the travel of the carrier on its guide rods is shortened by the length of rod 109. As is now evident, the sound reproducing apparatus can be set for varying lengths of the sound track arrays by providing adapters of suitable dimensions. Only one adapter is shown and is generally preferable, but it would, of course, be possible to provide a separate adapter for control of the carrier travel in each direction.

Figure 23:
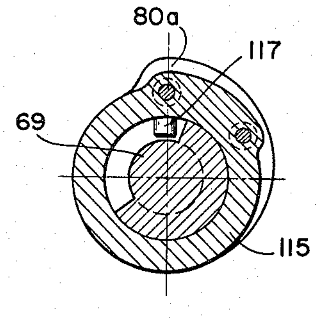
FIG. 23 is a section taken on line 23—23 of FIG. 22.
Figure 22:
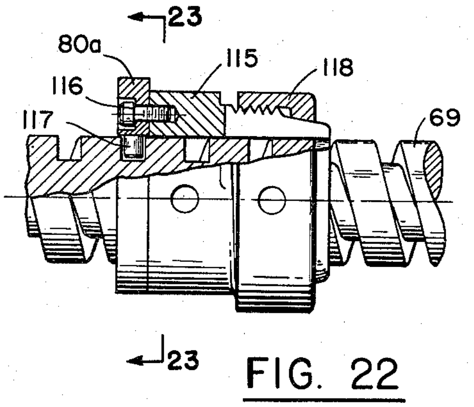
FIG. 22 is a fragmentary perspective view, partly in section, of a further modification of the control mechanism of the apparatus.

FIGS. 22 and 23 show another arrangement for varying the effective length of the carrier travel on its guide rods. In the aforedescribed embodiments of the invention, cam discs 80 and 81 are stationary and adjustment is made by varying the effective length of the cam follower. According to FIGS. 22 and 23, the cam discs are adjustable on the respective grooved rods. The arrangement is shown in connection with rod 69. According to FIGS. 22 and 23, cam disc 80a is secured to a collet chuck 115 by means of one or several screws 116. The cam disc or the chuck itself has an internal tooth 117 which fits in the helical groove of rod 69. The cam disc can be set in any desired position on the rod and is secured in a position selected in accordance with the length of the sound track arrays to be scanned by tightening a lock ring 118. Tightening of this ring will press the tongues of the collet chuck against the periphery of rod 69.

As is apparent, the location of the cam disc controls the point of reversal of the carrier by engagement with the cam follower 83 thereof. The control of the lateral displacement of the sound pickup assemblies may be controlled by means of the push rod 112 described in connection with FIG. 19.

Figure 24:
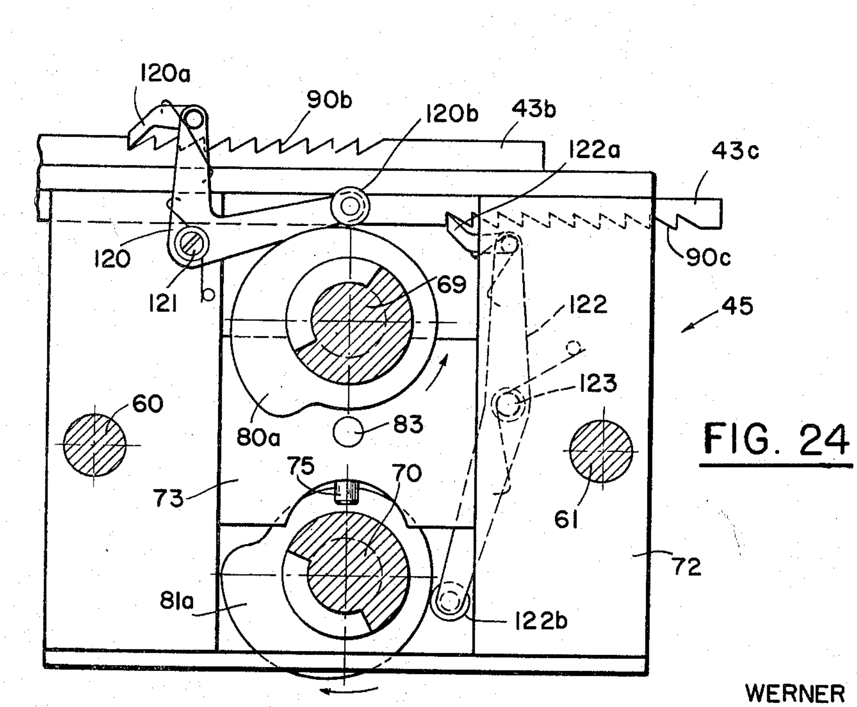
FIG. 24 is a fragmentary elevational view, partly in section, of the apparatus utilizing the modification of the control mechanism show in FIGS. 22 and 23.

FIG. 24 shows an arrangement in which the adjustable cam mounting of FIGS. 22 and 23 is utilized to control both, the reversal of the carrier travel and the lateral transport of the sound pickup assemblies. For this purpose, cam discs 80a and 81a control, with part of their camming surfaces, cam follower 83 on coupling member 73 of the carrier as previously described, and with another part of their camming surfaces, the setting bars 43b and 43c of the two sound pickup assemblies. Bars 43b and 43c should be visualized as corresponding to the previously described bars 43 and 43a. The ratchet and pawl arrangements of FIG. 24 again comprise ratchet teeth 90b and 90c, respectively. The pawl of one of the ratchet and pawl arrangements comprises a bell crank lever 120, pivotal about a pivot 121. One end of the lever terminates in a tooth 120a engaging the ratchet teeth 90b and the other end in a cam follower 120b coacting with cam disc 80a.

The pawl of the other pawl and ratchet arrangement comprises a lever 122 pivotal about a pivot 123. One arm of lever 122 terminates in a tooth arm 122a engaging teeth 90c and the other arm terminates in a cam follower 122b coacting with cam disc 81a.

As is apparent, the two cam discs, if suitably correlated, will alternately actuate coupling member 73 and will also alternately displace setting brackets 43b and 43c for the purpose aforedescribed.

In the hereinbefore described embodiments the reciprocating drive of carrier 45 is effected by connecting and disconnecting, respectively, the respective components of the carrier to and from rods 69 and 70. In the embodiments according to FIGS. 25 through 28 drive of the carrier is effected by coupling the same either with the taut side or the slack side of an endless belt drive.

Figure 25:
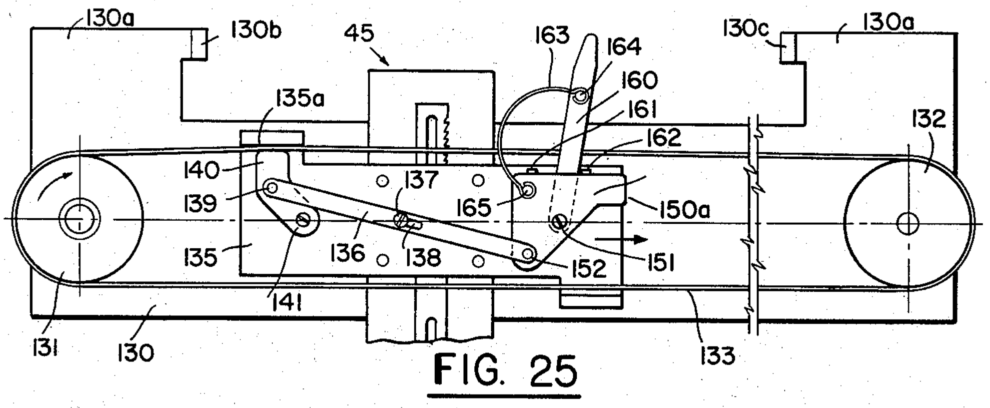
FIG. 25 is a plan view of a modification of an installation according to the invention.
Figure 26:
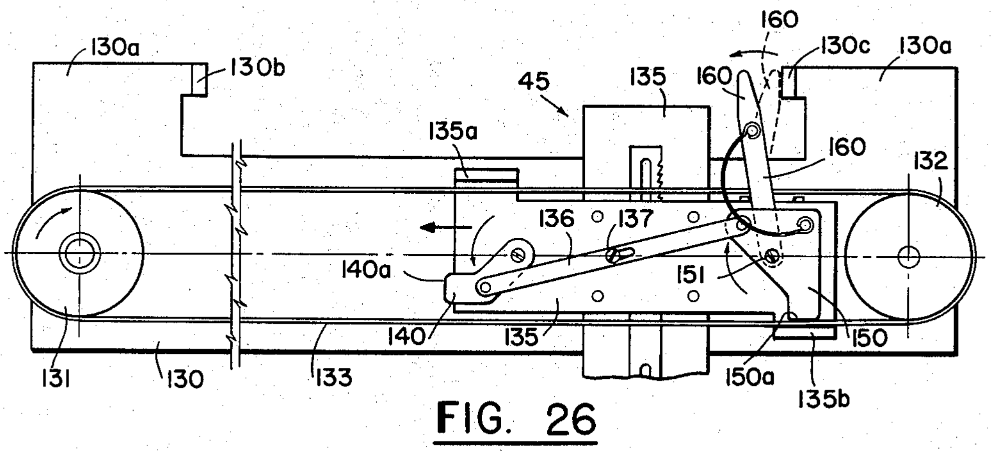
FIG. 26 is an elevational view of FIG. 25.

Referring now in detail to FIGS. 25 and 26, the installation according to these figures comprises a bed frame 130 mounting two pulleys 131 and 132, one of which, say the left-hand pulley, is driven by a suitable motor (not shown) in the direction indicated by an arrow. The two pulleys drive a belt 133, the upper part of which is the slack part of the belt and the lower part is the taut part. The bed frame 130 is formed with two turrets 130*a*, the portions 130*b* and 130*c* of which constitute limit stops. The distance between the two stops controls the limit of the carrier travel in either direction.

The carrier 45 sound heads and other components mounted thereon are evident from the previous description and reference is made to the pertinent figures such as FIGS. 3, 4, 10 and 11.

CARRIER DRIVE AND DIRECTIONAL CONTROL MEANS

The drive and control mechanism is mounted on a bed plate 135 which in turn is bolted or otherwise secured to the top plate of carrier 45. Plate 135 mounts a two-arm lever 136 pivotal about a pivot 137. The lever is mounted by means of a slot 138 to permit a limited lengthwise displacement of lever 136. One arm of lever 136 is linked at 139 to a clamping pad 140, which is in turn pivotally mounted on plate 135 by means of a pin 141. Clamping pad 140 and more specifically the surface 140*a* of the clamping pad are designed to coact with an abutment flange 135*a* protruding from bed plate 135. In the position shown in FIG. 25 pad 140 presses a portion of belt 133 against abutment flange 135*a*, thus drivingly coupling the carrier assembly to the belt and as a result driving the carrier from left toward the right.

The angular position of lever 136 and with it the clamping action of pad 140 are controlled by a control plate 150 pivotal on bed plate 135 by means of a pivot 151. Plate 150 may either occupy the position of FIG. 25 or the position of FIG. 26. In the latter position a clamping surface 150*a* on plate 150 presses the belt against a second abutment member 135*b* protruding from bed plate 135, thus coupling carrier 45 to the belt for travel from the right toward the left.

Lever 136 is linked to plate 150 by a pivot 152 and as a result, turning of plate 150 from the position of FIG. 25 into the position of FIG. 26 effects a turning of lever 136 from the position of FIG. 25 into the position of FIG. 26, whereby clamping pad 140 is withdrawn from its position clamping the belt.

The position of plate 150 is controlled by means of a control arm 160, also pivotal about pivot 151. The angular movement of lever 160 is preferably limited by two stops 161 and 162. The lever is biased by means of a bow spring 163, which on one end is secured to arm 160 at 164 and at the other end to plate 150 at 165.

As is apparent, in the position of FIG. 25 in which the arm rests against stop 162, spring 163 tends to turn plate 150 in counterclockwise direction, thus pressing pad 140 against the belt as intended. When now the carrier travels from the position of FIG. 25 towards the position of FIG. 26, arm 160 is arrested by stop 130*c* as soon as the arm reaches the position indicated in dotted lines. As a result, arm 160 is turned in the direction of the arrow while the carrier continues its original direction of travel until spring 163 is bent beyond its point of equilibrium and snaps plate 150 from the position of FIG. 25 into the position of FIG. 26, thus uncoupling the carrier from the slack part of the belt and coupling it to the taut part thereof. The carrier now travels towards stop 135 where the same cycle is repeated in reverse order.

Figures 27, 28:
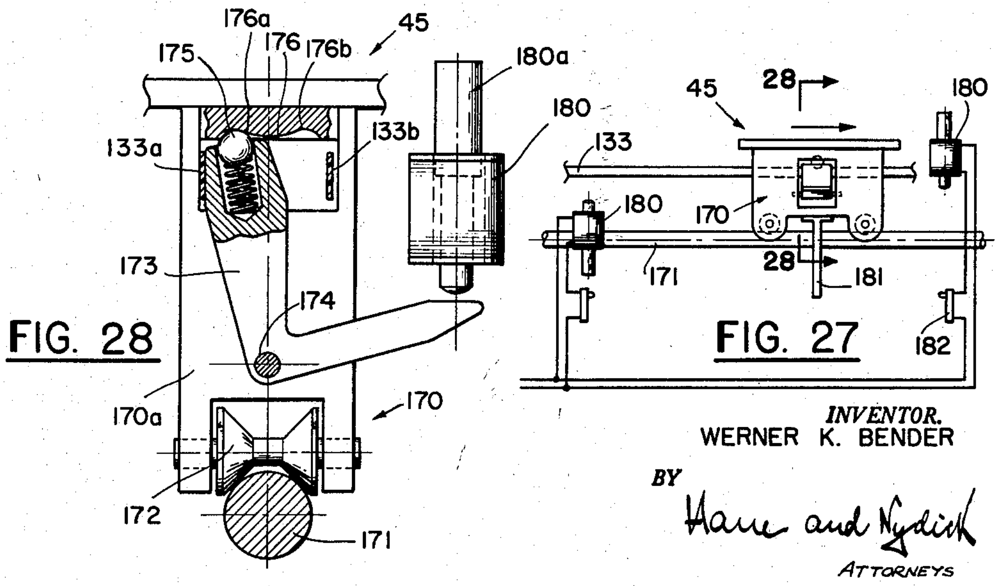
FIG. 27 is a fragmentary elevational view of still another modification according to the invention.
FIG. 28 is a section taken on line 28—28 of FIG. 27 on an enlarged scale.

In the installation according to FIGS. 27 and 28 the carrier assembly is carried by means of a trolley assembly 170 on a guide rod 171. The trolley is shown as comprising a frame 170*a* depending from the carrier assembly proper and mounting a trolley wheel 172. Drive of the carrier in one or the other direction is again effected by clamping the carrier either to part 133*a* or part 133*b* of belt 130. The clamping action is effected and controlled by means of a bell crank lever 173 pivotally mounted on frame 170*a* by means of pivot 174. One arm of the lever engages by means of a spring loaded ball 175 either a detent 176*a* or a detent 176*b* in a detent plate 176 mounted on the carrier. In the position shown in FIG. 28 lever 173 presses the belt part 133*a* against frame 170 thus coupling the carrier for drive in the direction in which belt part 133*a* is traveling. The position of lever 173 is controlled by the energization of a solenoid 180. The movable core 180*a* of the solenoid, when attracted, will force lever 173 from the position shown in FIG. 28 into the position in which ball 175 engages detent 176*b*. The solenoid, in turn, is controlled by a control bar 181 depending from the carrier assembly and operating a switch 182 when the carrier reaches one of its limit positions, say the right hand limit position. Operation of switch 182 actuates solenoid 180 as previously described. A similar control arrangement is provided at the other end of the travel of the carrier assembly.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An installation for reproducing sound from a sound record area associated with a visually observable object, said installation comprising a sound track support having thereon a sound record area in the form of a plurality of parallel sound tracks of equal length, said support being physically associated with the object to be visually observed, a sound pickup assembly, a carrier supporting said assembly, guide means supporting and guiding said assembly carrier along said sound tracks, said pickup assembly being slidable on said carrier transversely of the carrier travel along said guide means, reversible drive means for driving said assembly carrier along said guide means in either direction, first control means coacting with said drive means to reverse the driving direction thereof at each end of said guide means, and second control means coacting with said pickup assembly to displace the same at each end of the guide means transversely of the direction of the carrier travel into a sound reproducing position with the next adjacent sound track, said second control means including step by step transport means disposed between said assembly carrier and pickup assembly transversely slidable on the carrier, the step by step transport means comprising a ratchet and pawl means interposed between said carrier and said pickup assembly transversely slidable on the carrier.

2. An installation according to claim 1, wherein said first control means comprise a pair of actuating means, one at each end of said guide means, for controlling the driving direction of said drive means, said actuating means being operable by engagement with said assembly carrier and operation of either actuating means effecting reversal of said drive means.

3. An installation according to claim 2 and comprising limit means for varying the effective length of said guide means, said limit means being insertable between said assembly carrier and said actuating means, insertion of said limit means reducing the effective length of said guide means by the length of the limit means in the direction of the guide means.

4. An installation according to claim 3, wherein said limit means are attachable to the assembly carrier for travel in unison therewith.

5. An installation according to claim 1, said transport means being operable in response to said carrier reaching either end of said guide means, each operation of said transport means effecting a transverse displacement of the pickup assembly through a distance placing the pickup assembly in a sound reproducing relationship with the next adjacent sound track.

6. An installation according to claim 5, and stationary actuating means mounted adjacent to each end of said guide means engageable with said ratchet and pawl means, engagement of the ratchet and pawl means by either actuating means effecting transverse displacement of said pickup assembly through said distance.

7. An installation according to claim 6, wherein said pickup assembly comprises a bar for supporting said pickup means, said bar being mounted on the carrier slidable transversely of the direction of the carrier travel and toothed along one of its longitudinal edges, and a spring loaded pawl pivotally mounted on the carrier and biased into engagement with one of the teeth on said bar, engagement of said pawl with either of said stationary actuating means turning the pawl through a distance effecting displacement of the bar by the width of one tooth and disengagement of the pawl from the respective actuating means effecting re-engagement of the pawl with a next adjacent tooth.

8. An installation for reproducing sound from a sound record area associated with a visually observable object, said installation comprising a sound track support having thereon a sound record area in the form of two arrays of parallel linear sound tracks of equal length, said arrays being disposed on opposite sides of the object to be visually observed, and a pair of sound pickup assemblies each coacting with one of said arrays, a carrier supporting said pickup assemblies, guide means supporting and guiding said carrier along said arrays, a pair of drive means for driving said carrier along said guide means, one of said drive means being arranged to drive the carrier in one direction and the other in the opposite direction, said pickup assemblies being mounted on the carrier slidable transversely of the path of travel of the carrier, coupling means for drivingly coupling said carrier with either one of said drive means, first control means disposed adjacent to each end of said arrays and operated by the carrier upon reaching an end of one of said guide means to couple the carrier with the respective other one of said drive means thereby effecting reciprocatory travel of the carrier along said arrays, and second control means for controlling the transverse positions of said pickup assemblies on the carrier, said second control means being actuated in response to the carrier reaching either end of its travel, actuation of the second control means alternately displacing the pickup assemblies into sound reproducing position with the next adjacent sound track of the respective array.

9. An installation according to claim 8, wherein said drive means comprise two spirally grooved rods rotary in opposite direction and extending parallel to each other and said arrays, said first control means controlling said coupling means for drivingly connecting said carrier to either one of said rods.

10. An installation according to claim 9, wherein said coupling means comprise a coupling member on said carrier movable transversely of said two rods between two limit positions and mounting two drive pins engageable in either one of said limit positions with the groove of the respectve one of said rods, and wherein said first control means comprises a pair of cam discs each secured to one of said rods at opposite ends thereof and a cam follower on said movable coupling member, engagement of said follower with the respective cam disc in either end position of the carrier moving the coupling member into the respective limit position thereby effecting coupling of the coupling member to alternate rods.

11. An installation according to claim 10, wherein means are provided for releasably retaining said coupling member in either limit position.

12. An installation according to claim 10, wherein said retention means comprise a pair of magnetic means on the carrier magnetically attracting said coupling member in either limit position thereof.

13. An installation according to claim 8, wherein said pickup assemblies each comprise a sound pickup head coacting with the respective arrays and a support bracket mounted on the carrier slidable transversely of the path of travel thereof, and wherein said second control means comprise a pair of step-by-step transport means supported on said carrier each coacting with one of said brackets, and an actuating means stationarily mounted adjacent to each end of the guide means and engageable with the respective transport means at each end of the carrier travel, each engagement of a transport means effecting transverse transport of the respective bracket through one step thereby alternately placing the respective head in pickup position with the next adjacent sound track of the respective array.

14. An installation according to claim 13, wherein each of said step-by-step transport means comprises a ratchet and pawl arrangement the ratchet being formed by a toothed longitudinal edge of the respective bracket and the pawl being pivotally mounted on the carrier engageable with the respective actuating means and spring biased into engagement with one of said teeth, engagement of an actuating means with the respective pawl effecting transport of the respective bracket by the width of one tooth and disengagement of the actuating means releasing the respective pawl for engagement with a next adjacent tooth of the respective bracket.

15. An installation according to claim 8 and comprising a carrier travel limiting means for reducing the length of travel of said carrier, said limiting means being attachable to said carrier to extend the effective length thereof in the direction of travel of the carrier toward an end position, said first control means being operated by said limiting means in a position of the carrier short of an end position by the length of said limit means.

16. An installation according to claim 15, wherein said drive means comprise two spirally grooved rods rotary in opposite directions and extending parallel to each other and said arrays, and wherein said coupling means comprise a coupling member disposed on said carrier movable transversely of said rods between two limit positions and mounting two drive pins engageable in either one of said limit positions with the groove of the respective one of said rods, said first control means comprising a pair of cam discs each secured to one of said rods at opposite ends thereof and a cam follower movably supported on said limiting means, linkage means connecting said cam follower to said coupling member for controlling the position of the coupling member by the position of the cam follower, engagement of said follower with the respective cam disc moving the coupling member into the respective limit position thereby effecting coupling of the coupling member to alternate rods upon travel of the carrier toward either end position by a distance reduced by the length of said limit means.

17. An installation according to claim 8, wherein said sound track support comprises a member having two plane parallel surfaces bearing said arrays on opposite sides, the sound tracks of both arrays being parallel to each other and of equal length in both arrays.

18. An installation according to claim 17, wherein said support member constitutes a mounting frame for the object to be visually observed.

19. An installation according to claim 8, wherein said sound track support comprises a member having two plane parallel surfaces coated with magnetic recording material on opposite sides, the sound tracks of said arrays being recorded on said magnetic coatings.

20. An installation according to claim 8 and comprising a casing, the top of said casing constituting a platform for supporting said track support and the object to be visually observed.

21. An installation according to claim 20 and comprising locating means for locating objects to be visually observed and track supports of varying sizes on said platform in a selected position.

22. An installation according to claim 8 wherein said drive means comprises a driven endless belt including two substantially rectilinear parts traveling in opposite direction, and wherein said coupling means comprises clamping means for clamping, when actuated, said carrier to either one of said belt parts, said first control means, when operated by said carrier reaching either end of said guide means, actuating said clamping means for clamping the carrier to the respective one of said belt parts.

23. An installation according to claim 22 wherein said clamping means comprise two movable clamping portions each coacting with one of said belt parts and a lever means pivotally supported by said carrier, said lever means being linked to said clamping portions to control the clamping position thereof by the angular position of said lever means, and wherein said first control means comprise a toggle mechanism coupled with said lever means, said mechanism in one toggle position holding the lever means in a position clamping one clamping portion to one belt part and in another toggle position clamping the other clamping portion to the other belt part, and actuating means at each end of said guide means coacting with the toggle mechanism to move the same from said one toggle position into said other toggle position.

24. An installation according to claim 22 wherein said clamping means comprise a clamping member pivotally mounted on said carrier, said clamping member clamping in one pivotal position the carrier to one belt part and another pivotal position to the other belt part, and wherein said first control means comprise a solenoid means at each end of said guide means, each of said solenoid means when actuated moving said clamping member from one pivotal position into the other.

25. An installation according to claim 24 wherein each of said solenoid means is included in an energizing circuit also including a control switch located at the respective end of the guide means, and wherein an actuating member is supported on said carrier for travel in unison therewith, said actuating member operating the respective control switch when the carrier reaches either end of said guide means, thereby actuating the respective solenoid means.

References Cited by the Examiner

UNITED STATES PATENTS

| | | | |
|---|---|---|---|
| 2,548,011 | 4/51 | Frost | 35—35 |
| 2,668,718 | 2/54 | Roberts | 274—41.4 |
| 2,743,317 | 11/57 | Roberts | 179—100.2 |
| 2,822,425 | 2/58 | Hicks | 179—100.1 |
| 2,849,542 | 8/58 | MacChesney | 274—4 |
| 2,973,410 | 2/61 | Hoshino | 179—100.2 |
| 2,973,967 | 3/61 | Freeman | 274—20 |
| 3,031,534 | 4/62 | Trumble | 179—100.2 B |

IRVING L. SRAGOW, *Primary Examiner.*

NEWTON N. LOVEWELL, BERNARD KONICK, *Examiners.*